June 22, 1965
C. W. HATCHER ETAL
3,190,706
COMMODITY VENDING MACHINE
Filed Nov. 20, 1963
8 Sheets-Sheet 1
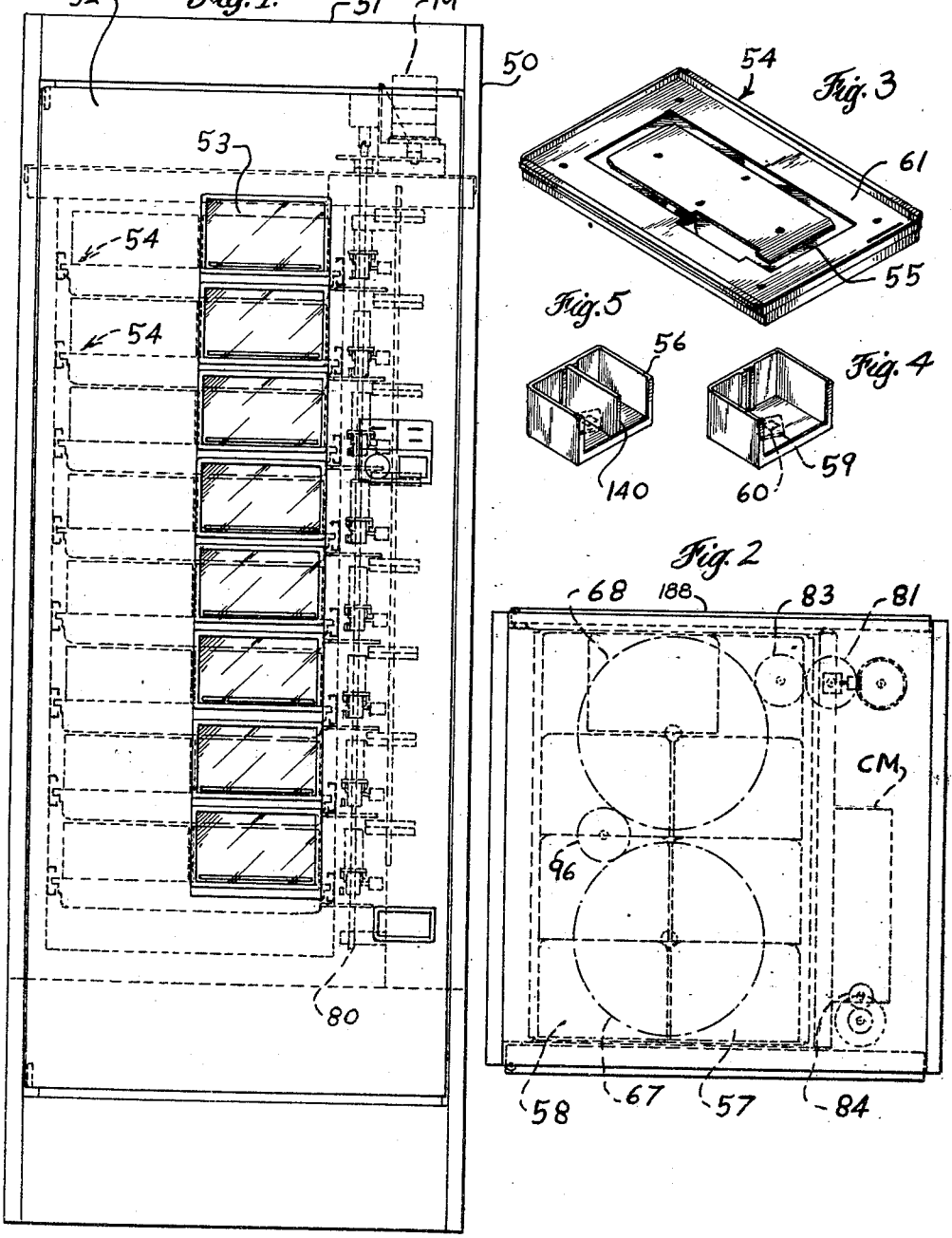
INVENTORS
Creel W. Hatcher
Harry W. Clauss
BY John E. Mellor
Symmestvedt & Lechner
ATTORNEYS

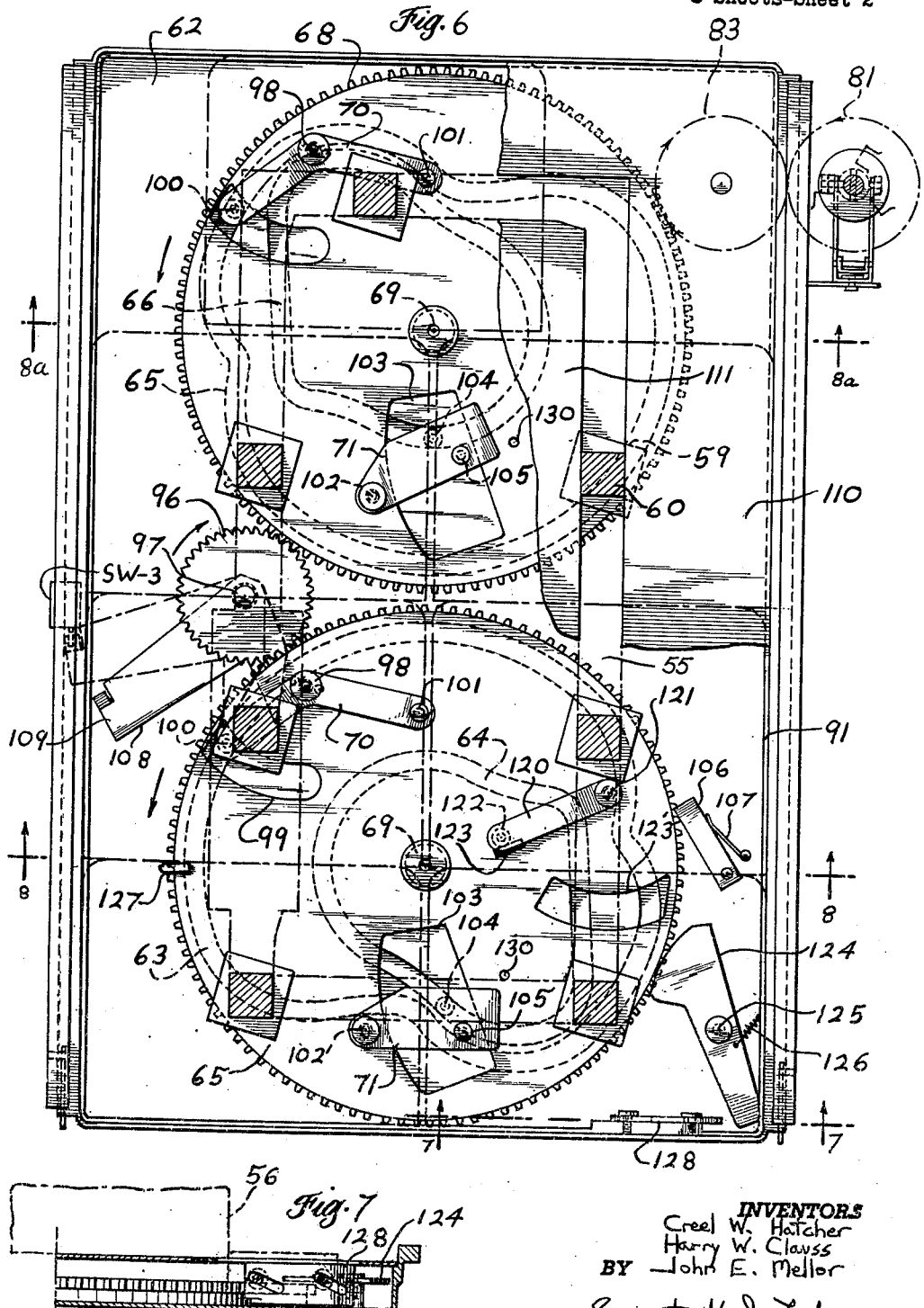

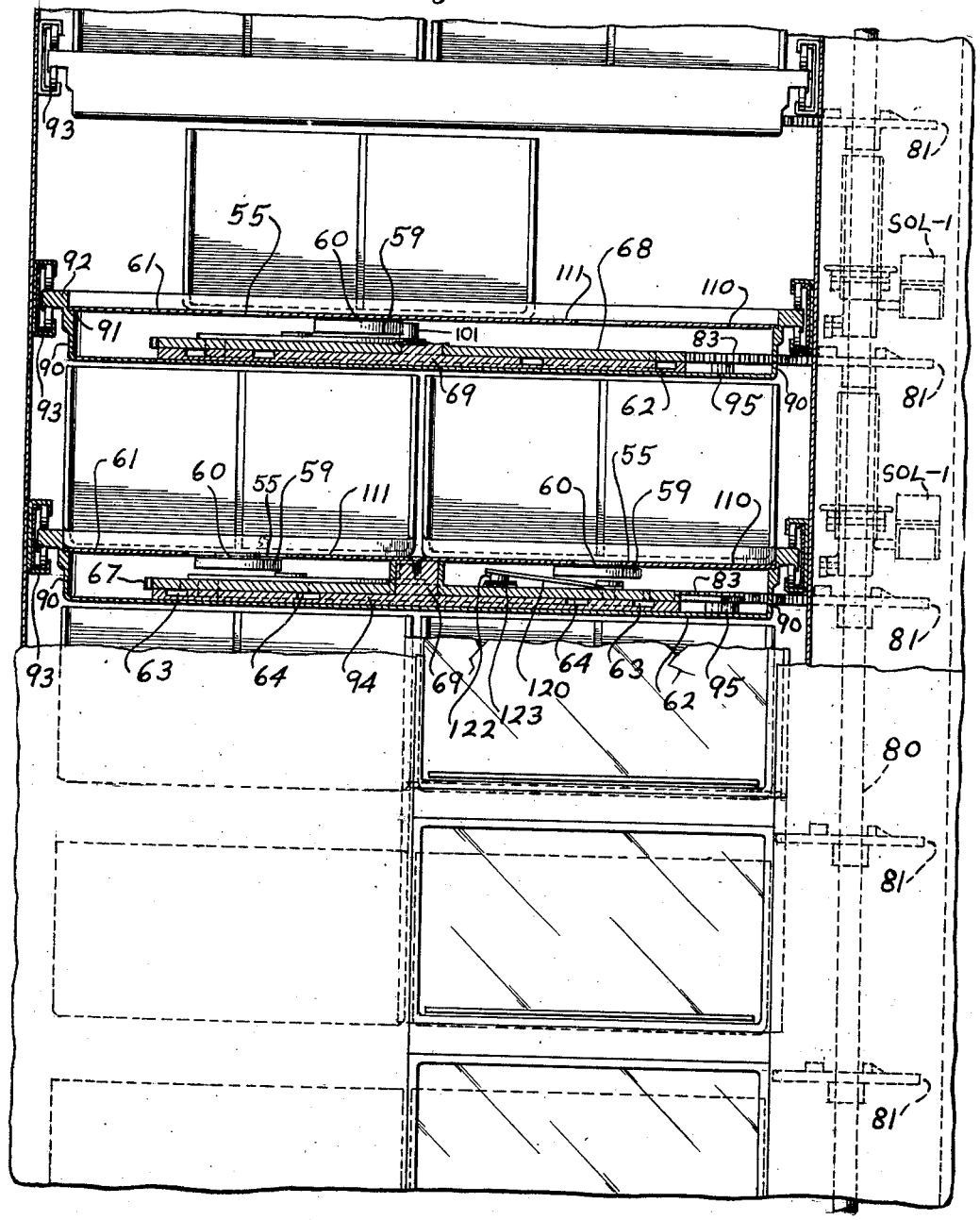

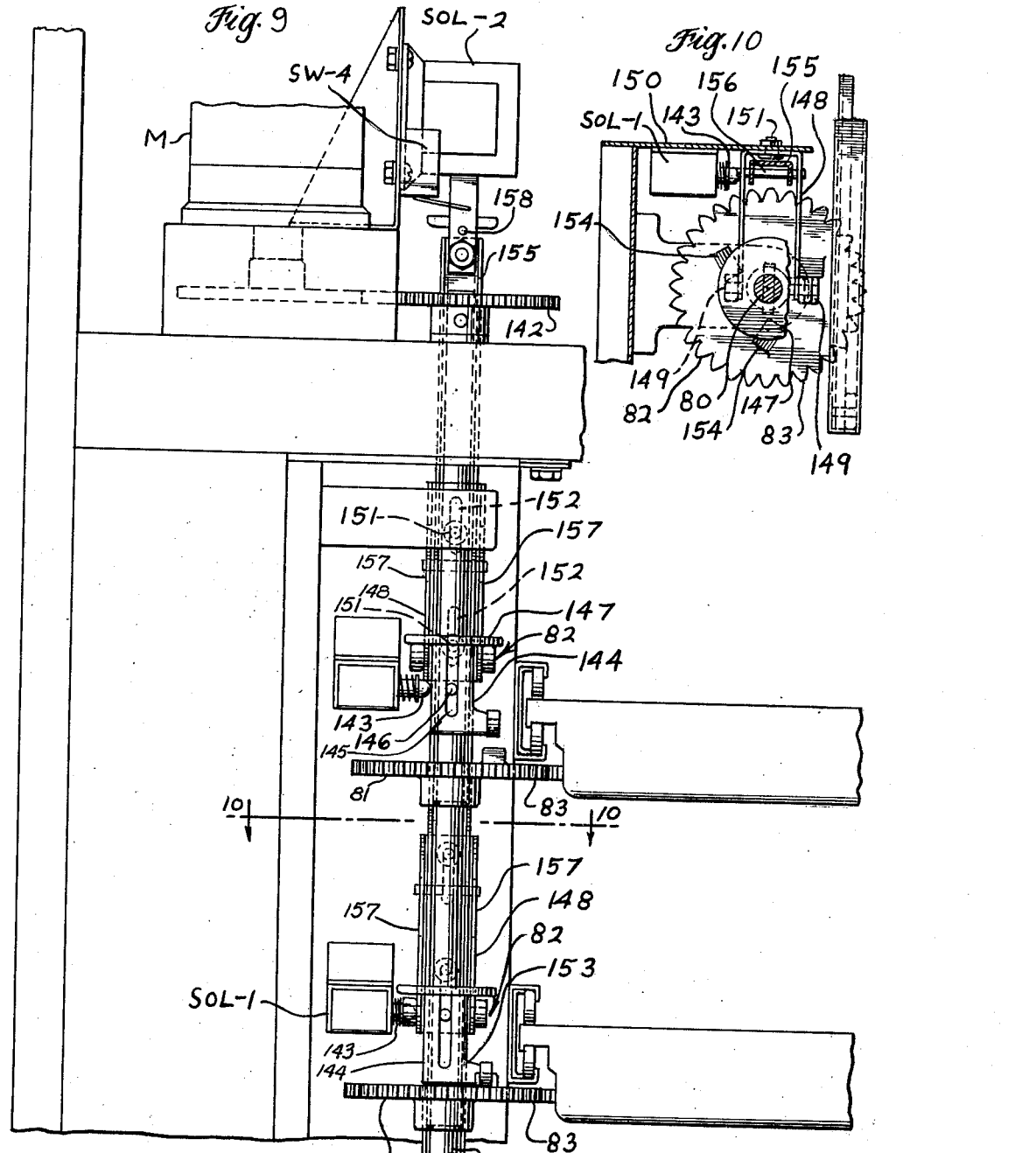

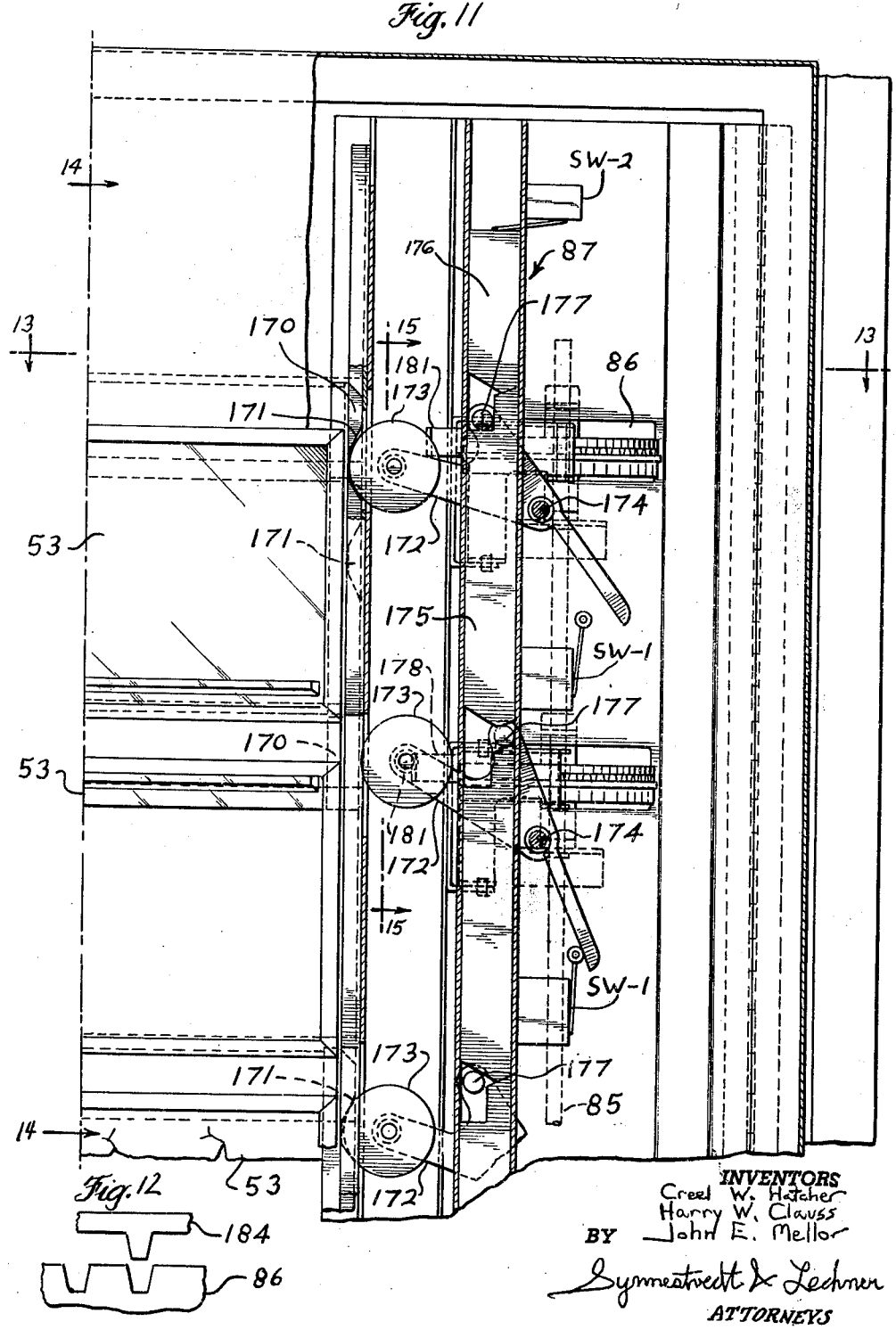

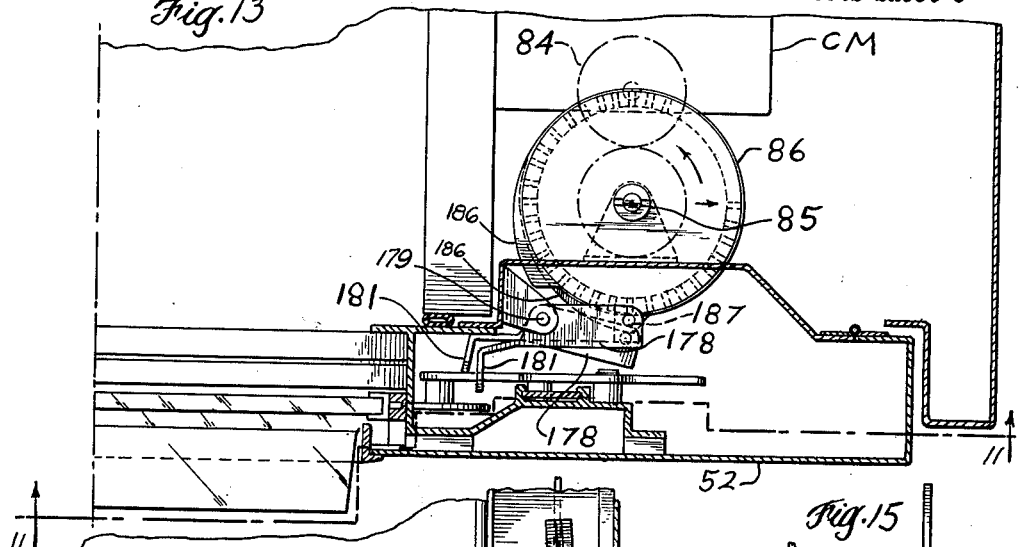
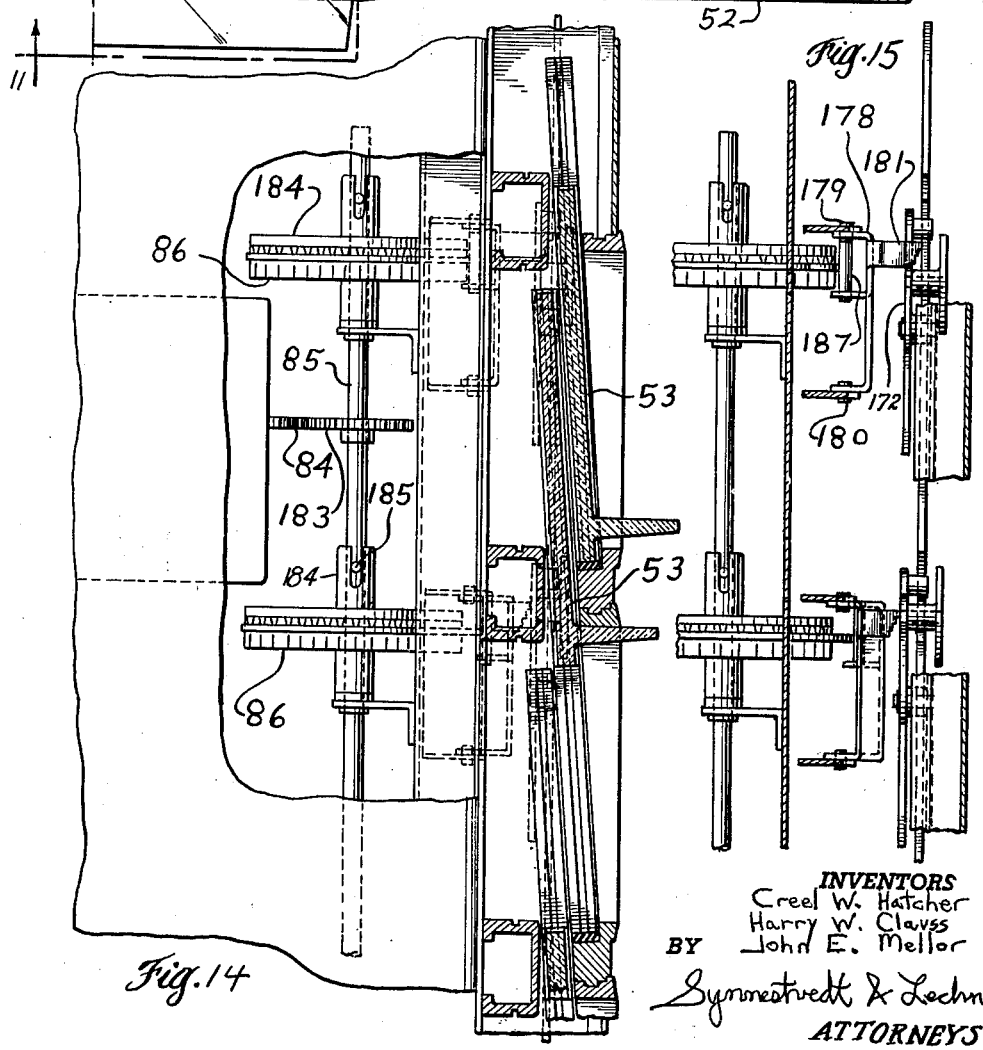

INVENTORS
Creel W. Hatcher
Harry W. Clauss
John E. Mellor
BY
Synnestvedt & Lechner
ATTORNEYS

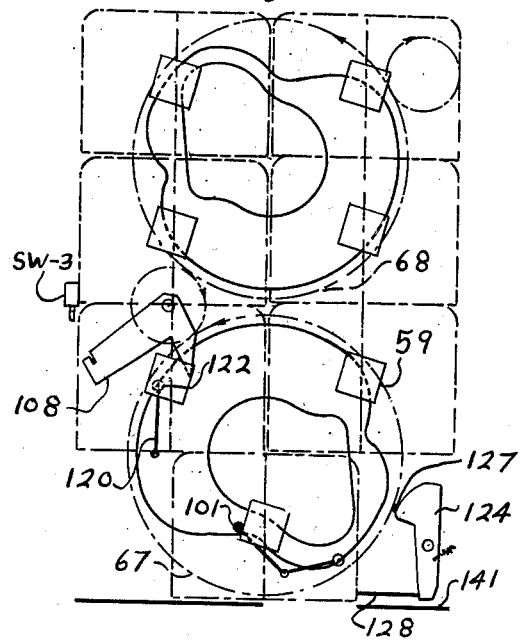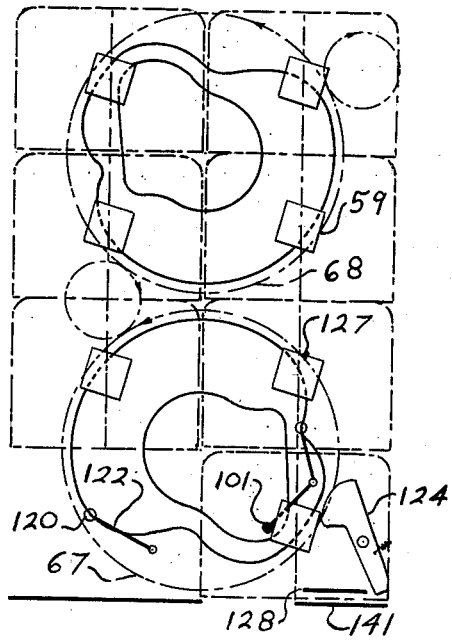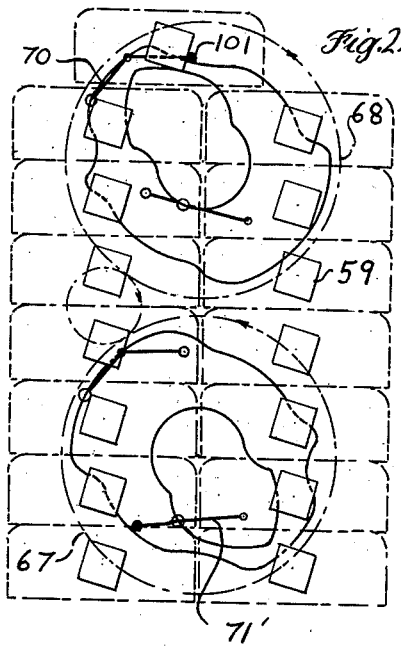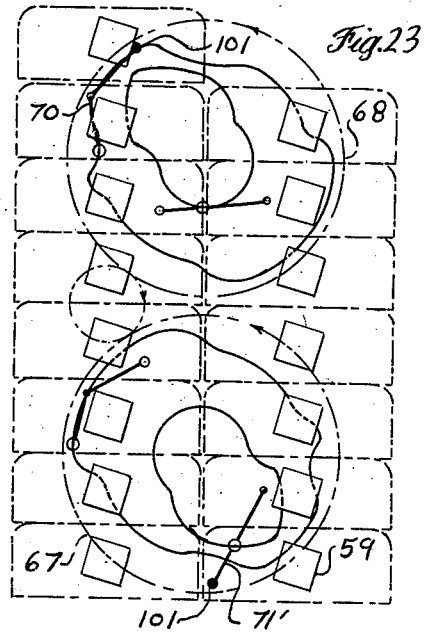

United States Patent Office 3,190,706
Patented June 22, 1965

3,190,706
COMMODITY VENDING MACHINE
Creel W. Hatcher, Gladwyne, and Harry W. Clauss and John E. Mellor, Warminster, Pa., assignors to Rudd-Melikian, Inc., Hatboro, Pa., a corporation of Pennsylvania
Filed Nov. 20, 1963, Ser. No. 325,091
23 Claims. (Cl. 312—97)

This invention relates to commodity vending machines. It is particularly concerned with machines of this type which are intended to vend individual commodities one at a time.

Several problems have been encountered in the use of commodity vending machines of the type generally employed heretofore. These problems have become more serious as vending operations have been expanded to include items such as pastries, cooked and uncooked sandwiches and platters, fresh fruit, and other food which is fragile and irregular in shape. One type of known vending apparatus employs a storage compartment in which the goods to be vended are stacked on top of each other in columns, and utilizes a dispensing mechanism in which the goods are dropped down a delivery chute to a pick up station. Machines of this general kind operate with varying degrees of success when used with goods such as bottled soft drinks, cigarettes and candy bars. But both the magazine type storage and the gravity delivery features of this type of machine tend to damage items such as apple pie and ham sandwiches. Another disadvantage commonly encountered in this type of machine is that the customer cannot always see the very item which he is purchasing. Any disparity between the item appearing in the display window of such a machine and the item actually delivered from the inventory magazine will tend to cause customer dissatisfaction.

Another type of machine which has been commonly used consists generally of a cabinet containing one or more lazy susan type wheels which are divided into wedge shaped compartments. Means are provided for sequentially rotating the lazy susan wheels to bring the compartments serially into position behind an access door. Insertion of money by the customer unlocks the access door and the customer opens it and reaches into the machine to take the commodity, such as a cup cake, out of the compartment. This type of machine is not as likely to damage the goods as the machine discussed above, but there are other disadvantages. Because of the round shape of the lazy susan and the consequent wedge shaped commodity compartments, such a machine is very inefficient in storage. In other words, an objectionable amount of space inside the machine is wasted because, while the housing is generally right-prismatic in shape, the storage zone is confined to a much smaller cylindrical volume. This disadvantage is quite important when the vending machine is refrigerated or is operated as a freezer or oven.

The vendng apparatus of the present invention is designed to overcome the disadvantages present in both of the foregoing types of commodity vending equipment. On the one hand, it eliminates the stacked inventory and drop chute dispensing, which tends to damage many commodities, and it enables the customer to see the very item he is purchasing. On the other hand, the apparatus of this invention has a storage zone which is generally prismatic in shape, and which utilizes the space within the enclosure of the unit much more efficiently. This feature makes the unit particularly suitable for storage and vending of refrigerated foods.

In accordance with one of the important aspects of the invention, there are provided commodity trays, each carrying a series of commodity boxes. In one form of equipment each commodity box is designed to hold one item such as a piece of pie or a piece of fresh fruit. The commodity boxes are arranged on the tray in two files and the tray is so positioned within the cabinet that one of the commodity boxes is located behind an access door. A customer, having inserted sufficient money into the coin mechanism, opens the access door and removes the commodity in the box positioned immediately behind it. After the customer has allowed the access door to close, machinery forming part of the tray operates to shift commodity boxes from one file to the other, and to shift the files along the tray in opposite directions, thus moving the boxes through a closed circuit. The result of these operations is that the recently emptied commodity box is moved from behind the access door and another box, having in it an article of food or other article, is moved into the vending position behind the access door. The machine is then in a position to make another sale.

By providing the rotating set of commodity boxes, and the means for moving them about on the tray in a circuit, the invention has overcome the most serious disadvantage of the lazy susan type equipment, in that, with the new apparatus the storage unit is now prismatic in shape and not cylindrical.

One of the objects of the present invention is the provision of commodity vending apparatus in which an individual carrier is provided for each item in the inventory and which is arranged to vend the item directly from its carrier.

Another object of this invention is to provide commodity vending apparatus arranged for first-in-first-out service providing for continuous individual support of each commodity item through and including the vending thereof and at the same time providing generally prismatic storage space.

Another object of the present invention is to provide improved means for shifting commodity boxes on a commodity tray to and from vending position.

Still another object of this invention is the provision of a shifting box type commodity tray adapted to shift boxes each having one or more than one compartment therein, said tray being readily convertible from use of one type of box to the other.

It is an object of this invention to provide a vending machine having a plurality of commodity trays, each carrying shiftable commodity boxes thereon in which a single driving unit is utilized to operate all of the commodity trays, and in which trays may carry differing numbers of commodity boxes thereon.

A further object of the invention is the provision of a multi-tray vending apparatus, each tray having thereon a plurality of commodity boxes, in which different trays in the apparatus carry items offered for sale at different prices.

Another object of the invention is the provision of vending apparatus having a commodity tray which carries a plurality of commodity boxes and having driving apparatus for shifting the boxes on the tray in which the driving apparatus is arranged to complete a box shifting operation with boxes in self locked position so they cannot be shifted by a customer reaching through the access door of the machine.

Still another object of the invention is the provision of a vending apparatus having a commodity tray and having shiftable commodity boxes of improved design for use in cooperation with the tray.

A further object of the invention is the provision of a multi-tray vending machine having trays which carry a plurality of shiftable commodity boxes, and the commodities on the various trays are offered for sale at differing prices, in which access doors for all trays offering commodities for a preselected price and, if desired, for a lesser price are unlocked upon insertion of the preselected price, and in which the opening of one of said unlocked doors actuates mechanism to prevent the opening of any other unlocked doors.

It is an object of this invention to provide a multi-tray vending apparatus having a single drive unit for moving commodity boxes about on each of the trays and in which each tray is slideably mounted to be drawn out of the cabinet of the apparatus for restocking and mechanical servicing.

The foregoing objects, together with other objects and purposes of the invention, may be more readily understood by considering the detailed description which follows together with the accompanying drawings in which:

FIGURE 1 is a front elevational view of a vending apparatus constructed according to the invention having eight commodity trays therein;

FIGURE 2 is a plan view of the vending apparatus of FIGURE 1;

FIGURE 3 is an isometric view of a commodity tray of the kind used in the unit of FIGURE 1;

FIGURE 4 is an isometric view of an improved commodity box of the present invention;

FIGURE 5 is an isometric view showing an improved commodity box like that of FIGURE 4 which has been provided with a divider for separating the boxes into two compartments;

FIGURE 6 is a plan view on an enlarged scale as compared with the foregoing figures of a commodity tray and certain mechanisms carried thereon and associated therewith, with commodity boxes carried by the tray shown in dot and dash lines, and with part of the upper deck of the tray being broken away and shown in dot and dash lines;

FIGURE 7 is a fragmentary elevational section taken on the line 7—7 of FIGURE 6 and illustrating a blocking unit employed when two compartment boxes, such as that of FIGURE 5, are employed;

Figure 16:
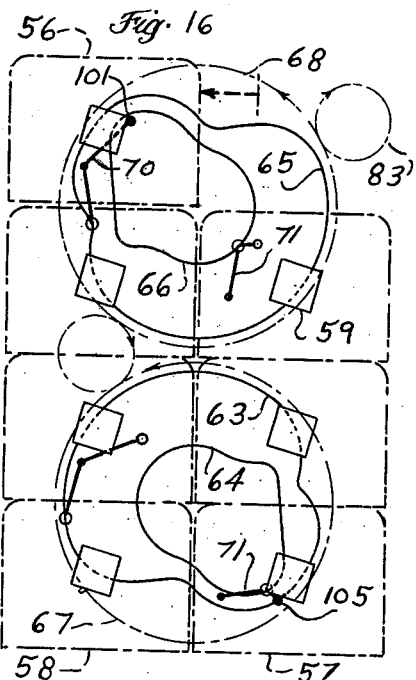

FIGURE 8 is in part a front elevational view and in part a sectional view on the same scale as FIGURE 6, the lower portion of the figure being in front elevation, the lower middle portion of the view being in section, the section being taken on line 8—8 of FIGURE 6, and showing one tray in section, the upper middle portion of the view also being in section, the section being taken on line 8a—8a of FIGURE 6, and showing the next tray above in section, and the upper portion of the view being in elevation with the front of the apparatus omitted to show the top tray of the unit in front elevation;

FIGURE 9 is an elevational view on a scale which is further enlarged as compared with FIGURE 8 of drive mechanism for the trays of the unit, said drive mechanism including selectively operable clutches and mechanism for resetting the clutches;

FIGURE 10 is a plan section of a portion of the driving mechanism, the section being taken on line 10—10 of FIGURE 9;

FIGURE 11 is a sectional elevational view of locking and unlocking mechanism associated with the access doors of a multi-tray unit, the view showing mechanism interconnecting the coin mechanism with the doors for unlocking certain of them upon the deposition of a given sum in the coin mechanism, the view being taken approximately on the line 11—11 of FIGURE 13;

FIGURE 12 is a fragmentary view of a detail of a price wheel and price disc shown in FIGURE 11;

FIGURE 13 is a plan view of the door locking and unlocking equipment for the vending machine of FIGURE 1, the view being taken on line 13—13 of FIGURE 11;

FIGURE 14 is a vertical section of the doors and of the associated mechanism, the section being taken approximately on the line 14—14 of FIGURE 11;

FIGURE 15 is a vertical section, the section being taken approximately on the line 15—15 of FIGURE 11;

FIGURES 16 through 19 are diagrammatic plan views illustrating the sequence of box shifting maneuvers performed on a tray when boxes of the kind illustrated in FIGURES 4 and 6 are used;

FIGURES 20 and 21 are diagrammatic plan views similar to FIGURES 16 through 19, but which illustrate the sequence of box shifting maneuvers performed on a tray when boxes having two compartments, such as that shown in FIGURE 5, are used; and FIGURES 22 and 23 are diagrammatic plan views similar to FIGURES 16 through 19, but illustrating the sequence of box shifting maneuvers on a tray when boxes of a smaller size are used.

*General description*

Before the details of the various portions of the apparatus are explained, a brief general description of the construction and operation will be given for purposes of orientation.

In FIGURE 1 there is shown a vending machine 50 constructed according to the invention. The machine has a cabinet or enclosure 51 which is generally in the shape of a rectangular prism having a loading door 52 in the front. On the front of the machine are eight commodity access doors 53. One commodity tray 54 is positioned within the machine behind each of the access doors 53. As can be seen in FIGURE 3, the tray is generally rectangular and has in the upper deck thereof a generally rectangular slot 55.

Each tray 54 carries on it a series of commodity boxes 56 such as those shown in FIGURES 4 and 5. The boxes are open topped and have one open side. For purposes of the present general description, only single compartment boxes such as that shown in FIGURE 4 will be considered. The boxes 56 are positioned on the tray with their open sides all facing toward the front of the tray; thus a box sitting on the tray immediately behind the access door 53 can hold a commodity, such as a piece of cake, where it can be seen by the customer and where the customer can reach it upon opening the access door for that tray. The general arrangement of the boxes on the tray can be understood from FIGURE 2 where it appears that seven boxes are placed on the tray and they are arranged in two files, the first file 57 extending from immediately behind access door 53 toward the rear of the tray and the second file 58 running beside the first file and extending from the front of the tray toward the rear. Each file contains three boxes. The seventh box on the tray appears in FIGURE 2 near the back of the tray at a point in transition between the two files.

Returning to FIGURE 4 for a moment, it can be seen that each box 56 is provided with a pusher block 59 mounted underneath the box on a post 60. The boxes are so positioned on the tray 54 that the pusher blocks extend through the rectangular slot, the edges of which guidingly engage the post 60 of the box over most of the length of the slot.

Beneath the upper deck 61 of the tray is a lower deck 62 which appears most clearly in FIGURE 6. Equipment for shifting the boxes about on the tray is mounted between the two decks. This equipment will be considered in detail later; the following brief outline will suffice for present purposes. Four cam tracks are provided in the floor of the lower deck 62. Two of these are located toward the front of the tray, and two toward the rear. As can be seen in FIGURE 6, the outer cam track 63 and inner cam track 64 located toward the front of the tray each form closed loops, and, in a manner of speaking, are concentric with each other. That is to say, the smaller cam track 64 lies entirely within the loop of the larger cam track 63. Similarly, at the back of the tray are outer cam tracks 65 and inner cam tracks 66 which are also concentric closed loops in the sense used here. Mounted on the lower deck of the tray are a pair of cam wheels 67 and 68. The wheel 67 is mounted for rotation on axle 69 which lies within the loops of both cam tracks 63 and 64. As can be seen from FIGURE 6, the cam wheel is larger in diameter than either of the loops of the cam tracks. The cam wheel 67 carries a pair of levers 70 and 71 which are pivotally mounted thereon. Each lever has a cam follower depending therefrom and a pusher stud protruding upward therefrom. The construction of the cam wheel at the back of the tray is quite similar to the one just discussed.

The cam wheels are synchronously driven and as they rotate the cam follower ride around in the cam tracks on the floor of the lower deck. In doing so, they alter the position of the pusher studs on the levers. The levers are so designed and positioned on the cam wheels and the cam tracks are so developed that the pusher studs engage the pusher blocks 59 of certain of the boxes at appropriate times to shift the box about on the upper deck of the tray.

Figure 17:
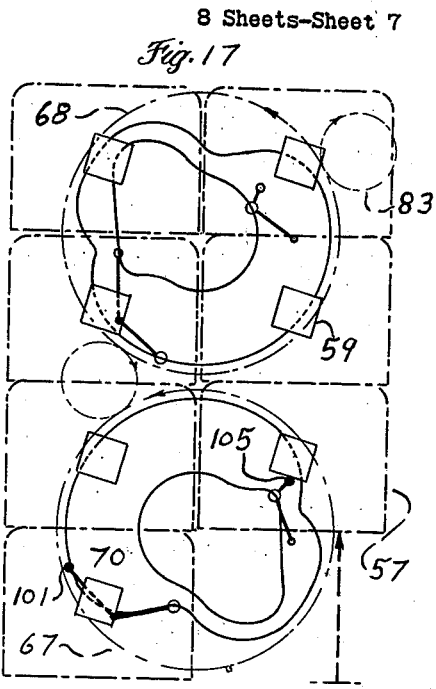
Figure 18:
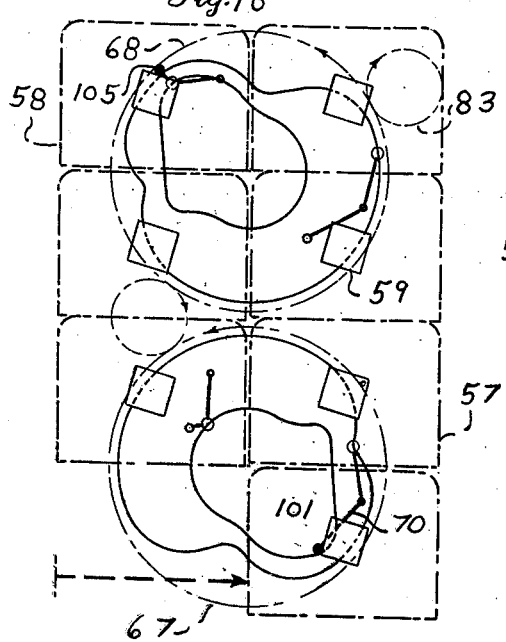
Figure 19:
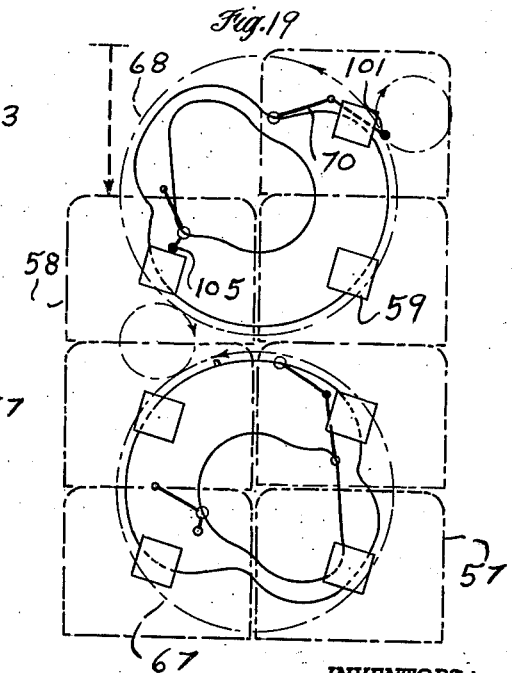

FIGURE 6, and the sequence of diagrams, FIGURES 16 through 19, illustrate a typical type of box-shifting arrangement. At the time a customer makes a purchase, the commodity boxes are positioned on the tray as shown in FIGURE 6. The customer removes his purchase from the box located in the lower right-hand corner of that figure. After the access door for that tray has been closed, the cam wheels are rotated and the pusher studs engage the pusher blocks on the boxes to perform the following movements. First, as shown in FIGURE 16, a pusher stud carried by the cam wheel at the back of the tray pushes the box which was sitting approximately mid-way between or astride the two files 57 and 58 to the left into the second file 58. Second, file 57, which is shorter than the length of the tray, is pushed from the front of the tray to the back by a pusher stud carried on the front cam wheel as shown in FIGURE 17. Next, the box at the front of the second file 58 is pushed toward the right as shown in FIGURE 18 to transfer it from the second file to the first file 57. With this addition to it, file 57 now occupies substantially the full length of the tray, and file 58 is shorter than the tray. In the next operation, a pusher stud carried by the back cam wheel pushes the boxes forming file 58 to the front of the machine. This step is shown in FIGURE 19. Finally, a pusher stud on the back cam wheel pushes the rear-most box of the first file 57 part of the way across to the second file 58. The cam wheels stop turning before this box has been pushed all of the way across. With the unit stopped in this condition, the boxes are effectively self locked so that a person trying to manipulate them by reaching through the access door is unable to do so.

By the foregoing maneuvers of the boxes, a commodity box containing an item for sale has been moved into position behind the access door, and the commodity box which was emptied has been moved away from the access door.

Power for the mechanism in all of the trays is provided by motor M which can be seen at the top of the unit in FIGURE 1. Turning now to FIGURE 9, it can be seen from that figure that motor M is connected through gearing with a shaft 80 which runs substantially the full height of the unit. At the level of each tray is a gear wheel 81 which is mounted on the shaft 80 for rotation. Gears 81 are selectively coupled to the shaft 80 for rotation therewith by the drop clutches indicated generally at 82. Mechanism which will be explained later is provided for disengaging the clutches 82 at appropriate times. The gears 81 mesh with a drive gear 83 on each of the trays. (Gears 81 and 83 also appear on FIGURE 6.)

A coin mechanism CM is provided within the enclosure as shown in FIGURE 2. The coin mechanism is preferably of a type which creates an angularly variable output signal, as by rotating a gear through a preselected angle for each unit of money inserted into the coin mechanism. The output gear of the coin mechanism can be seen diagrammatically at 84 on FIGURE 2. The output gear is connected through gearing to shaft 85 which runs substantially the height of the unit. At about the level of each tray there is mounted on the shaft 85 a pricing wheel 86 settable at variable angular positions on shaft 85, which includes a cam for operating door unlocking mechanism, which mechanism need be considered only generally at this point, although it will be discussed fully later herein. As can be seen in FIGURE 11, the door unlocking mechanism includes a tumbler column indicated generally at 87. As will be explained later, the tumbler column is constructed to insure that once a given door has been opened on the machine, none of the other access doors can be opened. The angular position of the before mentioned cams on the pricing wheels can be variably set so that the cam will unlock the access door with which it is associated when a preselected amount of money has been placed in the coin mechanism. Thus it can be seen that the pricing wheels on several doors can be set to unlock their doors upon the insertion of a given amount of money.

With the foregoing in hand, a brief description of the operation of the machine can be given with particular attention to the relation between the several trays of the unit.

A customer, upon approaching the machine, and upon inspection of the goods which can be seen in the various commodity boxes located behind the windows 53 decides preliminarily how large a purchase he plans to make, and inserts that amount of money into the machine. By doing this, the customer causes the rotation of the price wheels on shaft 85 and some of them have their cams positioned to unlock their access door for that amount of money. Other doors remain locked because their pricing cams are set to unlock the door only upon insertion of a greater amount of money. The customer now makes his final selection by opening one of the unlocked doors and removing the commodity, such as a cup cake, from the commodity box behind the door. The opening of the door constitutes a signal that it will be necessary to shift the boxes on the tray associated with that door and this signal is employed to engage the clutch on shaft 80 with the gear wheel 81 associated with that tray. After he has removed his purchase, the customer closes, or allows to close, the access door. The closure of the access door is a signal that the boxes on that tray are ready for shifting, and is caused to start motor M.

The tray-shifting mechanism discussed heretofore, pushes the commodity boxes about on the tray in the sequence outlined above and the motor M turns off when the operation has been completed. The apparatus has once again been put into condition to make another sale.

*Tray construction*

Attention is directed to FIGURES 6, 7 and 8 where the details of the structure of the commodity trays appear most clearly. The lower deck of the tray is preferably constructed of metal, and, as can be seen in FIGURE 8, the side walls 90 may be integrally formed therewith. At the top of the side wall is a ledge 91 facing inwardly for supporting the upper deck 61 and a flange 92 facing outwardly for engaging the rails 93 mounted on the side wall of the enclosure or cabinet. The cam tracks 63, 64, 65 and 66 are positioned on the floor of the lower deck, and may, if desired, be formed directly from the material comprising the lower deck. However, in the construction shown in the drawings, as can be seen in the elevational view of FIGURE 8, the cam tracks are formed in a separate cam piece 94 which is fixed to the floor of the lower deck. FIGURE 8 shows that cam piece 94 also includes axle 69 on which the cam wheel 67 is mounted for rotation. The cam tracks themselves are slots of substantially uniform width, the width being slightly greater than that of the cam followers which ride in the tracks. The shape of the cam tracks is a function of the required motion of the pusher studs which engage the pusher blocks on the commodity boxes. Other factors which affect the shape of the cam tracks include size and mounting of the lever carrying the cam follower and the pusher studs, the relative angular position of the lever on the cam wheel, the size of the boxes as compared to the size of the tray, and the position and shape of the pusher blocks with respect to the boxes proper. In view of this, certain variations can be introduced in the arrangement and shape of the cam tracks herein without departing from the scope of the invention.

In the preferred embodiment the cam wheels 67 and 68 are gear wheels. The drive train is from clutch driven gear 81 turning on shaft 80 through gear 83 (mounted for rotation on an axis 95 fixed to the lower deck 62) to cam wheel 68 at the back of the tray. A connecting gear 96 is mounted on an axle 97 fixed to the lower deck 62. Thus rear cam wheel 68 drives connecting gear 96 which in turn drives front cam wheel 67 in the same direction and at the same speed as the rear cam wheel 68.

As can be seen from FIGURES 6 and 8, the cam wheels are preferably large enough in diameter to completely cover the sesparate cam pieces 94 and in doing so cover the cam tracks completely.

Cam wheel 67 has mounted on its top a lever 70, which is pivotally mounted on pin 98. A slot 99 is made in the cam wheel adjacent the lever. The slot extends radially of the wheel a distance great enough to span the outer cam track at every point along its loop. One end of the lever 70 is provided with a cam follower 100 which depends from the lever through the slot 99 into the outer cam track 63. At the other end of the lever 70 there is mounted an upwardly protruding pusher stud 101. This stud is tall enough to make pushing contact with the pusher blocks 59 on the boxes, but is short enough to fit under the upper deck 61 of the tray.

Lever 71 is pivotally mounted on the top of the cam wheel 67 at pin 102. A slot 103 is formed in the cam wheel 67 adjacent the lever 71 in a manner similar to the slot 99 which cooperates with lever 70. Slot 103 extends radially of the wheel a distance great enough so that it always spans the inner cam track 64. A cam follower 104 depends from lever 71 through slot 103 and into cam track 64. An upstanding pusher stud 105 is also mounted on lever 71. Like stud 101, it is sized to effectively engage the pusher blocks 59 but it is short enough to clear the upper deck of the tray.

The rear cam wheel 68 has mounted on it two levers which are substantially the same as those on the front cam wheel 67. For this reason the levers, studs, cam followers and slots of the rear cam wheel 68 are given the same reference numbers as the corresponding parts on the front cam wheel.

From the foregoing description, one can see that when the front cam wheel 67 is rotated the cam followers 100 and 104 move along the cam tracks 63 and 64 respectively. In doing so, they move the levers 70 and 71 about their pivot pins and thus change the relative position of the lever on the cam wheel. The pusher studs 101 and 105 each traverse a path as the cam wheel rotates, which is a resultant of (a) the angular movement of the cam wheel, and (b) the pivoting of the lever carrying the stud in response to the curve of the cam track.

The front cam wheel 67 cooperates with a pawl 106 which is urged into engagement with the gear teeth by the pawl spring 107. The placement of the pawl with respect to the wheel is such that it allows the wheel to turn freely in the design direction, but effectively blocks rotation of the wheel in the reverse direction. Thus the pawl materially reduces the susceptibility of the equipment to tampering by making it difficult to manipulate the boxes by reaching through the access door.

A switch actuating lever 108 is pivotally mounted on the axle 97 of connecting gear 96. One portion of the lever is a switch contacting arm 109 positioned to engage switch SW3 which is mounted at the side of the tray. Another portion of the lever is positioned to protrude beneath the cam wheel into the path of cam follower 100. Thus it can be seen that as cam wheel 67 rotates and moves cam follower 100 past the switch operating lever, the lever 108 will move into contact with switch SW3. Lever 108 is spring biased to move out of contact with the switch when the cam follower 100 has moved past it.

The upper deck 61 of the tray covers the equipment mounted on the lower deck. The upper deck is in two pieces, an outer frame 110 which rests on ledge 91, and an inner section 111 which is mounted on the ends of axles 69. The rectangular slot 55 forms the gap between the two sections of the upper deck. From FIGURES 3 and 6 it can be seen that the rectangular slot is uniform in width throughout its periphery except that along the left-hand leg of the slot there is a region of greater width. In addition, at the corners of the slot it is widened somewhat.

It will be remembered that on the bottom of each of the commodity boxes 56 (see FIGURE 4) there are mounted posts 60 carrying pusher blocks 59. In FIGURE 6 the commodity boxes themselves are shown in dot and dash lines but the posts and pusher blocks appear in full lines. From this figure it can be seen that the posts are square and of substantially the same width as the rectangular slot in the upper deck. Thus the slot serves as a guide track for the boxes by engaging the posts of the boxes. In this way the path of movement of the commodity boxes is defined and restricted to a substantially rectangular circuit or shape. The pusher blocks 59 are somewhat larger in size than the posts 60 and, since they are mounted on the bottom of the posts, they serve as anchors for the commodity boxes. That is to say, the pusher blocks 59 prevent one from lifting the commodity boxes off the tray. The portion of the slot which is widened is shown in the lower left-hand portion of FIGURE 6. Here the slot is wider than the pusher blocks and in this region of the slot, for servicing purposes, one may lift out or replace the commodity box.

It will be noted from FIGURE 6 that the pusher blocks 59 are cocked at an angle with respect to the posts 60, and indeed with respect to the general rectilinear orientation of the boxes and of the slot in the upper deck. By cocking the pusher blocks in this manner, it is possible to obtain more positive movement of the pusher studs 101 and 105 into and out of contact with the pusher blocks.

The equipment of the tray which has been discussed thus far comprises the basic elements for a tray using commodity boxes of a size and shape such that a tray will accommodate seven of them, and which boxes have only one compartment as shown in FIGURE 4. Stated differently, the tray equipment discussed so far will operate in the manner shown in FIGURES 16 through 19.

When it is desired to make use of two compartment boxes, such as those shown in FIGURE 5, a modified mode of shifting the boxes is preferably used. In order to carry out the modified form of operation, certain additional equipment is provided on the lower deck of the tray. In the preferred arrangement, this equipment is always present on the tray, but is arranged to be inoperative when the single compartment commodity box operation is being performed.

Auxiliary lever 120 is pivotally mounted on the front cam wheel 67 by pin 121. Lever 120 carries a depending cam track follower 122. When two compartment boxes are being used, the auxiliary lever is positioned with the cam follower 122 riding in the outer cam track 63. However, when single compartment boxes are being used, the lever is placed in its inactive position which appears most clearly in FIGURES 6 and 8. As can be seen in those figures, the cam follower 122 rests against a stop 123 on top of the cam wheel. It will be recalled from the above description that switch actuating lever 103 is operated by the cam follower which rides in the outer cam track 63. When two compartment boxes are employed, it is necessary to operate switch SW3 an additional time during the cycle. The cam track follower 122 performs this function.

A slot 123' formed in the cam wheel 63 adjacent lever 120 to accommodate cam follower 122 when it is in use. The slot is proportioned so that it will always span the outer cam track.

On the lower right-hand portion of the lower deck 62 of the tray as shown in FIGURE 6, is a stop bar operating lever 124 which is pivotally mounted on the floor of the tray at pin 125, and is biased by the spring 126 so that its upper end is urged toward cam wheel 63. Cam wheel 63 carries a trip lug 127 which engages the lever 124 and pushes it away from the gear wheel. A slotted stop bar 128 is mounted at the right front edge of the tray. The lever 124, when it is moved, pushes the stop bar up through a slot in the upper deck of the tray to a position where it will protrude into the path of a commodity box moving from left to right across the tray. The movement of the stop bar may best be understood by considering FIGURE 7 where it appears in its down position in full lines and in its up or blocking position in dot and dash lines. In this latter position, it is in contact with box 56 in that figure. The purpose of the stopping bar can be understood by a brief consideration of FIGURE 20. The mode of operation for a tray using two compartment boxes will be explained in detail later herein, but for now it can be pointed out that in such an operation it is necessary during the cycle to stop each commodity box in a position mid-way between the two files of boxes and at the front of the tray. This will place the one compartment of the box behind the access door (which has been narrowed for this type of operation). To insure that the customer will be unable to gain access to the left-hand compartment of the commodity box when it is in this position, the stop bar 128 is moved into its blocking position. When single compartment boxes are used, the stop bar is not needed. Lug 127 continues to move lever 124 and hence raise the stop bar, but the raising of the stop bar is only momentary inasmuch as the cam wheel 67 continues to rotate and the lug 127 quickly moves away from lever 124, thus dropping the stop bar 128. When two compartment boxes are used, cam follower 122 operates the switch actuating lever 108 to stop cam wheel 67 with lug 129 still in contact with lever 124. Thus the stop bar 128 is held in its up position during the entire time the box is in the position shown in FIGURE 20.

Sometimes commercial conditions require that a tray accommodate a larger number of boxes which are smaller than the seven box configuration discussed thus far. A fifteen box tray is diagrammatically illustrated in FIGURES 22 and 23. A great many of the parts of the tray discussed above are useful with a fifteen box tray without substantial modification. However, it is necessary to employ cam tracks which are shaped differently than those used with the seven box trays. This can be appreciated by comparing the diagrammatic cam outlines in FIGURES 20 and 22. While the path traversed by the pusher blocks in a fifteen box unit is still generally rectangular it has different dimensions than the path of travel for the seven box unit. For this reason, an upper deck with a differently shaped rectangular slot in it is required. Finally, the same cam wheels may be employed, but the shape and mounting position of the levers which carry the cam followers and pusher studs are desirably different. For this reason holes 130 are provided on the cam wheels for mounting the pivot pins of the levers for the fifteen box configuration.

From the foregoing, it will be understood that suitable modifications can also be made to equip the trays to handle other numbers of boxes.

*Tray operation*

Attention can now be turned to a detailed consideration of the manner in which the apparatus of this invention shifts the commodity boxes in the circuits they traverse on the tray. The first type of operation to be considered is one in which a set of seven one compartment boxes are provided on the tray.

The starting position for the seven box operation is shown in FIGURES 2 and 6. In those figures the access door is at the right-hand front side of the tray and the operation starts after a customer has opened the access door, removed the commodity from the box positioned immediately behind the door, and has closed the door. Upon opening of the door, the drive train between motor M and gear 83 is completed in a manner to be discussed later and motor M is started upon closure of the door. Drive gear 83 turns and inasmuch as it is connected to cam wheel 68, which is in turn connected to cam wheel 67, both of the cam wheels start to turn in a counter-clockwise direction as shown in the figures. As the rear cam wheel 68 turns, the pusher stud 101 on lever 70 engages the pusher block 59 on the box 56 which is astride the two files at the back of the tray. Stud 101 on the cam wheel 68 is shown in black on FIGURE 16 to indicate that it is in pushing contact with the adjacent pusher block 59. In FIGURE 16 the rearmost commodity box is shown just after it has been pushed from the starting position astride the files to a position at the back of the second file 58. After stud 101 of wheel 68 has completed pushing the rearmost box into the second file, the stud moves out of contact with the pusher block of that box.

The foregoing maneuver has created a vacant space at the right rear portion of the tray as can be seen in FIGURE 16, and the right-hand or first file 57 now comprises only three boxes. Pusher stud 105 of lever 71 of the front cam wheel 67 moves into contact with the pusher block 59 of the right-hand front box. Stud 105 is shown as a solid dot in FIGURE 16 to indicate it is in pushing contact with the stud pusher block. As the cam wheel 67 continues to rotate, the pusher stud 105 pushes the right-hand front box toward the rear of the tray, and in doing so pushes the entire first file to the back of the tray. FIGURE 17 shows the situation just after the first file 57 has been pushed to the rear. When this step has been completed, stud 105 slides out of contact with pusher block 59.

The maneuver which has just been completed has moved the recently emptied right-hand front box away from a position immediately behind the access door, and there has thus been created an open space at the right-hand front side of the tray. As can be seen in FIGURE 17, stud 101 of lever 70 on the front cam wheel 67 is moving toward pushing contact with the block 59 on the left-hand front commodity box. It pushes this box, which has in it a commodity, to the right into position immediately behind the access door. FIGURE 18 shows that the left-hand front box has been so moved from the second file 58 to the first file 57. As with the earlier maneuvers, the stud 101 is moved out of contact with the pusher block when the motion has been completed.

Now the first file 57 has four boxes once again, but the second file 58 has been reduced to three and an open space has been established at the left-hand front portion of the tray. With the boxes so arranged, pusher stud 105 of lever 71 on the back cam wheel 68 is brought into pushing position behind the rearmost box in the left-hand or second file 58. Stud 105 pushes the rear box forward, and in doing so moves the entire second file to the front of the tray. FIGURE 19 shows the boxes just after this maneuver has been completed and from that figure it can be seen that stud 105 on the rear wheel is about to be moved out of pushing contact with block 59 on the rearmost box of file 58.

The final step in the box shifting cycle consists is moving the rearmost box in first file 57 part away over to the second file to leave it astride the two files as shown in FIGURES 2 and 6. As can be seen in FIGURE 19, the stud 101 on lever 70 on the rear cam wheel is about to move into pushing position to urge the rearmost box of the first file to the left. When the rear cam wheel has rotated to a point such that the box being moved is approximately half way across, the front cam wheel 67 is in a position such that the cam follower 100 carried on lever 70 of the front cam wheel has contacted switch actuating lever 108 to operate switch SW3, thus interrupting the drive train to end the cycle with the boxes positioned as they are shown in FIGURES 2 and 6.

When boxes having two compartments are used, a modified cycle of operation is preferably employed. First it should be noted that as shown in FIGURES 4 and 5, a single compartment box can be converted into a two compartment box according to the invention by the insertion of a partition 140. The partition creates two commodity compartments in the box. Inasmuch as it is desired to expose only one compartment at a time behind the access door, a blocking plate 141 is mounted inside the access door on the right-hand side thereof to cut the effective width of the door in half. This appears most clearly in the diagrammatic views of FIGURES 20 and 21. In addition, the auxiliary lever 120 on the front cam wheel is positioned with its cam follower 122 riding in the outer cam track 63.

In order to understand the cycle of operation with compartmented boxes, one should consider FIGURES 2, 16, 17, 20, 21 and 19, in that order. The starting position of the boxes is substantially like that shown in FIGURE 2. Consider in that figure that all of the boxes are divided into two compartments and that the right-hand front box has an empty right-hand compartment, and a left-hand compartment having a commodity in it. Now suppose a customer opens the access door and removes the commodity from the left-hand compartment of the right-hand front box. The closure of the access door after the purchase starts motor M, and the cam wheels rotate to move the box which is astride the files at the back of the tray across to the second file 58. The position at the end of this movement is illustrated in FIGURE 16.

The cam wheels continue to rotate and pusher stud 105 on the front cam wheel pushes the first file to the rear of the tray as shown in FIGURE 17.

After the foregoing maneuver, stud 101 on the front cam wheel 67 pushes on the pusher block 59 of the left-hand front box shown in FIGURE 17. It pushes this box toward the right as viewed in FIGURES 17 and 20 to the position shown in FIGURE 20, that is, to a position with the right-hand compartment of the box positioned behind the unblocked portion of the access door. At the same time, lug 127 has operated lever 124 in the manner described above to move stop bar 128 into blocking contact with the box which has just been moved. FIGURE 20 shows the stop bar in operative position. At this time, the cam follower 122 carried by auxiliary lever 120 has moved around the outer cam track 63 to a point where it has pushed actuating lever 108 over to operate switch SW3. FIGURE 20 shows the cam follower and lever 108 just after they have cooperated to operate switch SW3. Operation of the switch interrupts the drive train and stops the box shifting operation with the boxes in position as shown in FIGURE 20. Now there is a box with its right-hand compartment holding a commodity in position for vending behind the access door.

The next event is another sales transaction. The customer raises the access door, and removes his purchase from the right-hand compartment of the front box in FIGURE 20. If the customer is inclined to attempt to push the box to the right while he is holding the door open in an attempt to gain access to the left-hand compartment of the box, he is foiled by stop bar 128 which blocks rightward movement of the box. On the other hand, if he is inclined to try to push the box to the left in an attempt to gain access to other boxes on the tray he is foiled because the pusher stud 101 is in contact with the pusher block on the box, and the stud 101 will not move because pawl 106 prevents rotation of the cam wheel carrying the stud. In any event, the customer closes, or allows to close, the access door.

Closure of the door causes motor M to start once again and the cam wheels begin to rotate. As the front cam wheel turns, lug 127 moves away from lever 124, thus allowing stop bar 128 to drop out of blocking position. Pusher stud 101 of the front cam wheel pushes the commodity box which was sitting with its right-hand compartment behind the usable portion of the access door toward the right and into the first file. At the completion of this maneuver, this box is positioned with its left-hand compartment behind the access door as shown in FIGURE 21, and it will be remembered that this compartment contains a commodity. In this way a new commodity is brought into position for vending purposes. The movement just described has created a vacancy at the left-hand front portion of the tray. Referring now to FIGURE 19, it can be seen that pusher stud 105 will come into contact with the rearmost box in the second or left-hand file and push the file to the front of the tray to eliminate the vacant space at the front and create a corresponding vacant space at the left-hand rear portion of the tray.

Pusher stud 101 on the back cam wheel 68 now engages the rearmost box in the right-hand or first file 57 and pushes that box to the left toward the second file. However, as this maneuver is in process, cam follower 100 moves actuating lever 108 to operate switch SW3 to interrupt the drive train and stop the cam wheels when the box being moved is at a position astride the files as shown in FIGURE 2. This completes a full cycle of operation for compartmented boxes.

From the foregoing description it can be seen that the position of boxes shown in FIGURES 2 and 6 may be considered a basic starting position for the box shifting cycle. An important advantage is obtained by utilizing such a starting point. In both the single compartment box operation and the compartmented box operation the boxes are arranged as shown in FIGURES 2 and 6 during a time when the access door is open and the customer is removing his commodity from the box or compartment immediately behind the door. After doing so, the customer may be inclined to experiment with moving the empty box in an effort to get it out of the way and place a new full box in position within reach of the door so that the commodity it carries can be removed without the insertion of more money into the machine. It is substantially impossible for the customer to successfully move the empty box out of the way because with the rearmost box sitting astride the files, there is no vacant space on the tray big enough to accommodate a box. Thus a customer cannot push the first file 57 to the rear; nor can he somehow reach over to the second file 58 and push it to the rear to create a space to move the empty box into. Thus it can be seen that the boxes in the position shown in FIGURES 2 and 6 are effectively in a self-locking configuration and valuable anti-theft protection is obtained without the addition of extra equipment.

Thus far the description has been restricted to a seven box tray. The invention is not restricted to a tray having seven boxes; in fact, many of the advantages can be obtained with a greater or smaller number of boxes on the tray. It is, however, preferred that an odd number of boxes be used in order to obtain the greatest advantage. In FIGURES 22 and 23 there is shown diagrammatically a tray accommodating fifteen boxes. As discussed above, many of the parts from a seven box tray can be used in a fifteen box tray without great modification. It should be noted, however, that the cam tracks have a different shape than those of the seven box unit. FIGURES 22 and 23 show stages in a box shifting operation for a fifteen box unit which is similar to the operation performed in a seven box unit.

FIGURE 22 shows a stage in the operation just after a customer has removed his purchase from the right-hand front box. Pusher stud 101 on lever 70 on the back cam wheel 68 pushes the rearmost box into the second or left-hand file. The completion of this operation is shown in FIGURE 23. Lever 71' on the front cam wheel 67 is somewhat different in shape and placement than that used on the seven box unit. However, it is similar in function and it can be seen that in FIGURE 23 pusher stud 105' on the front cam wheel 67 is being moved toward pushing contact with pusher block 59 on the right-hand front box. Stud 105' will thus push the first pile to the back of the tray to create a vacant space at the right-hand front portion of the tray. The remaining steps in the sequence consist in moving the left-hand front box from the second file to the first file; in pushing the second file to the front of the tray; and in pushing the rearmost box of the first file into blocking position astride the two files.

*Drive mechanism*

According to the invention only a single drive motor is utilized even in a multi-tray vending unit. The means by which this advantage is obtained are illustrated most clearly in FIGURES 9 and 10, although the drive mechanism can also be seen in dotted outline in FIGURES 1, 2 and 8. As mentioned hereinabove, a vertical shaft 80 is provided which extends for substantially the height of the stack of trays. The shaft is connected by gear 142 to motor M. A series of gears 81 are rotatively mounted on said shaft. They are mounted in a way so that they will be free to rotate even if the shaft 80 is held stationary and, conversely, unless they are connected through clutch means discussed below to the shaft they will remain substantially stationary while the shaft rotates. Each of the gears 81 is positioned on the shaft at a proper height to mesh with drive gear 83 which is carried by the tray 54 and which is the first element of the drive train that is mounted on the lower deck of each tray (see FIGURE 6).

From the description thus far, it can be seen that when motor M operates, shaft 80 turns, but gears 81 do not necessarily rotate with the shaft. At the general level of each tray there is provided a clutch generally designated at 82 for connecting the gears 81 with the shaft 80 for rotation therewith. Mounted adjacent the shaft at each tray level is a solenoid designated SOL-1. The plunger 143 of the solenoid is spring loaded in a way so that it is normally urged outwardly of the solenoid. This can be seen most clearly in FIGURE 9.

The clutch includes a clutch sleeve 144 which is mounted on the shaft above gear 81. The sleeve is slotted as at 145, and a pin 146 is passed through the shaft and through the slot thus insuring that the sleeve will rotate with shaft 80 even though at the same time the sleeve can be moved up and down on the shaft. A flange 147 is formed on the upper end of the sleeve 144.

A clutch supporting arm 148 is provided for holding the clutch sleeve in disengaged position above the gear 81 except during the times when it is desired to have the clutch engaged. As can be seen in FIGURE 10, the arm 148 supports the clutch sleeve 144 by extending under the flange 147 of the sleeve on each side of the shaft 80. In order to reduce the friction, the arm is provided with rollers 149 which make rolling contact with the sleeve as it turns with the shaft. Support arm 148 is generally U-shaped in plan view, as can be seen in FIGURE 10. It is slidably attached to support member 150 as by the nuts and bolts 151. As shown in FIGURE 9, slots 152 are cut in the base of the U to accommodate nuts and bolts 151 and at the same time provide for slidably mounting the arm on support member 150.

As can be seen in FIGURE 10, the solenoid SOL-1 is positioned so that its plunger 143 is spring urged into the vertical path of travel of the support arm 148 as it slides up and down on support member 150. When the support arm is slid upwardly, the plunger will protrude far enough into its path of travel that it will be located in a supporting position underneath support arm 148. The upper clutch assembly in FIGURE 9 illustrates this condition. When the solenoid is operated to withdraw the plunger 143 from beneath the support arm 148, the arm will slide downwardly, under the influence of gravity, along support member 150 until the nuts and bolts 151 is positioned at the end of slots 152. The lower clutch in FIGURE 9 illustrates the position of arm support 148 when solenoid plunger 143 has been moved from beneath it.

When the support arm 148 is in the upper position shown in the upper clutch of FIGURE 9, the arm holds clutch sleeve 144 above the gear 81 so there will be no coupling between shaft 80 and gear 81. When the support arm 148 is in its down position, as shown in the lower clutch of FIGURE 9, it is not providing any support for the clutch sleeve 144 and therefore the sleeve is resting on and supported by gear 81. It should be noted that the sleeve 144 has on it a projection 153 and that the gear 81 is provided with several tabs 154. When the shaft 80 begins to turn and the sleeve 144 is resting on gear 81, the sleeve will rotate with respect to the gear until its projection 153 engages one of the tabs 154. Gear 81 will then begin to turn with the sleeve 144 and with shaft 80.

From the discussion of the operation given above, one can understand that under ordinary circumstances only one clutch will be engaged at a time in a multi-tray unit, and that at the end of an operating cycle for a given tray, the clutch for that tray must be disengaged since there is no assurance that that clutch will be the one utilized during the next operating cycle. According to the invention means are provided for resetting the clutches in disengaged position. One advantage of the reset mechanism provided herein is that a single set of equipment will reset any of the clutches which happen to be engaged. As can be seen in FIGURES 9 and 10, a long reset bar 155 is mounted in the unit generally behind shaft 80. It may conveniently be placed so that it runs between the legs of the U-shaped supporting arm 148, as appears clearly in FIGURE 10. At each tray level a pin 156 is mounted on the reset bar 155. The pin engages the support member 148 through slots 157 in that member. Slots 157 are so proportioned that the pins 156 of the reset bar do not interfere with the dropping motion of the support arm and clutch sleeve, upon actuation of solenoid SOL-1. However, the proportions of the slots 157 are such that if reset bar 155 is lifted through a fairly long stroke, it will engage the support arm and lift it and its clutch sleeve somewhat above the level of the plunger 143 of SOL-1.

Reset bar 155 is suspended from the plunger 143 of solenoid SOL-2 mounted at the top of the unit. When SOL-2 is operated, the reset bar is lifted up through a fairly long stroke and it picks up the support arm and clutch sleeve of any clutch which has been engaged and lifts said sleeve so high that the plunger 143 of that clutch's solenoid SOL-1 moves into supporting position underneath the arm. This movement of the reset bar also lifts the support arms of the other presumably disengaged clutches for a short distance, but this does no harm since these arms are already supported in disengaged position by solenoid plungers 143. According to the preferred form of operation, the reset bar is lifted by SOL-2 while shaft 80 is still being turned by motor M. A switch SW-4 is mounted near the top of the reset bar where it can be operated by switch pin 158 upon upward movement of the reset bar. When this switch is operated, it turns off motor M.

Door locking mechanism

One advantage provided by the present invention is that the customer may be offered commodities from several trays of a multi-tray unit for a given price and that the final decision by the customer as to which commodity he will purchase need not be made until after he has deposited the sum which he has decided to spend. As mentioned above, a further advantage is that the customer can see every article he is choosing. Finally, in a multi-tray unit, different trays of commodities can be offered at different vending prices. In order to assure that these advantages are secured, it is preferred to use door locking mechanism embodying various features of the invention as shown on FIGURES 11 through 15. For purposes of orientation reference is also made to FIGURE 2. From that figure and from FIGURE 13 one can see that the access door locking mechanism is preferably positioned on the right-hand side of the unit and is mounted on the front door 52 so that when the door is swung open, the locking mechanism moves with it. Thus, the parts are conveniently presented for servicing and adjustment when the door 52 is open.

Turning now to FIGURE 11, one can see that the access doors 53 are preferably mounted in a vertical column and, as appears in FIGURE 14, are angled slightly so that they may be slid upwardly for opening. When a given window is open, it occupies a position generally behind the window next above. Mounted on one edge of each window is a bar 170 having in it a detent 171. As can be appreciated from FIGURE 11, the door bars 170 with their detents are arranged in a generally vertical column. Pivotally mounted on the frame of the front door 52 are a series of locking levers 172. One such lever is provided for each door. Each lever carries a locking roller 173 which fits into the detent 171 on the edge of the access door. From this description it can be seen that with the locking roller positioned in the detent, it will not be possible to raise the access door unless it is at the same time possible to pivot the locking lever 172 about its pivot pin 174. Thus, in FIGURE 11 the top door is closed, and its locking lever 172 is positioned with the roller 173 seated in detent 171. The second door from the top in FIGURE 11 is open. The detent 171 of this door is positioned an appreciable distance above roller 173 and locking lever 172 has been pivoted about its mounting pin 174 in a clockwise direction as compared with the position of the top locking lever.

A tumbler column designated generally as 87 is mounted adjacent the column of locking levers. For each access door there is provided a tumbler 175 which is slidably held in the tumbler column 87. In addition, a top tumbler 176 of slightly different configuration as compared with the other tumblers is provided. Each locking lever 172 carries on it a tumbler jamming pin 177. The tumbler jamming pin is so positioned that when its locking lever is pivoted clockwise by the opening of the door, the jamming pin moves between the tumbler associated with its door and the tumbler of the door next above.

In FIGURE 11 the third door from the top (which appears only in fragment) is closed. The jamming pin 177 of the locking lever for this door is positioned to move upon clockwise rotation of the lever into a position between the tumbler for the third door and the tumbler for the second door, and in doing so it will force the tumblers apart by lifting the tumbler of the second door from the top and, consequently, all other tumblers above it. In the situation shown in FIGURE 11, however, the third door from the top cannot be opened, because the second door from the top is already open. As FIGURE 11 shows, the jamming pin 177 for the locking lever of the second door is moved into position between the second door tumbler and the first door tumbler. A comparison of the tumbler positions between the third tumbler and the second tumbler on the one hand and the second tumbler and the first tumbler on the other hand will show that in the latter case the top tumbler of that pair has been raised in the column away from the lower tumbler of the pair by the jamming pin.

The consequences of this movement of the jamming pin with respect to the tumblers are that none of the other doors of the unit can be opened. Consider first the top access door of the unit. The jamming pin 177 for that door cannot be moved between the first door tumbler and the top tumbler 176, because the line of contact between these two tumblers has been lifted as a result of the opening of the second door from the top. Therefore, locking lever 172 for the top door cannot be rotated clockwise and since it cannot be so rotated, the locking wheel 173 on that lever cannot be moved out of detent 171. Since the locking wheel cannot move out of detent 171, the top access door cannot be raised. The situation just described is typical of the situation which will exist for all trays above the particular tray whose access door is open.

Consider now the third door from the top, which is located beneath the open second door. As explained above, the jamming lever of this door is in a position to move toward the third door tumbler and the second door tumbler. However, this movement cannot take place because the jamming pin of the second door is holding the tumblers beneath the second door in a fixed position. In other words, the jamming pin of the second door prevents the second door tumbler and any tumbler beneath it from sliding upwardly in the tumbler column. Since the tumblers adjacent the jamming pin of the third door from the top cannot be spread apart by sliding the top tumbler of the pair upwardly, the jamming pin cannot be moved between the tumblers. Therefore, the locking lever 172 for the third door cannot be rotated clockwise, and its locking wheel 173 cannot be moved out of detent 174 of the access door. Hence, this door cannot be opened. The situation just described is typical of that existing for all trays positioned beneath a tray with an open access door.

For each of the locking levers 172 a latch 178 is provided. The latch can best be understood by considering FIGURES 13 and 15. In FIGURE 13 two such latches appear, one for the top door of the unit and one for the second door from the top. As can be seen, the latch is pivotally mounted on vertical pins 179 and 180. Latch tongue 181 forming part of the latch is so positioned that when the latch is rotated counterclockwise, the latching tongue moves into position over locking lever 172. In FIGURES 11, 13 and 15 the tongue 181 of latch 178 for the top door is shown in position over locking lever 172. When the tongue is in this position, it prevents clockwise rotation of the locking lever, and from the discussion above it will be appreciated that prevention of such rotation effectively locks the access door. When the latch is pivoted around the pins 179 and 180, in a clockwise direction as viewed in FIGURE 13, the latch tongue 181 of the latch is withdrawn from over the locking lever. In FIGURES 11, 13 and 15 the tongue 181 of the latch 178 for the second door from the top is shown in its released position behind the locking lever 172 of the door, which lever has been rotated clockwise. Such clockwise rotation could not have taken place unless the latching tongue had first been moved back out of the way as here described.

In accordance with the invention, a door control mechanism is provided for selectively operating the various latches 178 which are associated with the several access doors. As can be sen in FIGURES 1, 2 and 13, a coin mechanism CM is provided. FIGURE 1 shows that coin slots 182 are placed on the face of the machine to accept coins which are delivered to the coin mechanism. The coin mechanism is preferably of the type which has an output mechanism, such as gear 84, whose angular position is varied in a preselected manner depending on the amount of money which has been inserted into the coin mechanism.

Control shaft 85 is connected by gear 183 to gear 84 in a manner to be driven thereby. Control shaft 85 runs substantially the full height of the unit. At each tray level along the shaft there is mounted a price wheel 86. Above the price wheel and resting on it is a pricing disc 184 which cooperates with the price wheel. As can be seen most clearly in FIGURES 14 and 15, the pricing disc has a slotted sleeve mounted on the shaft, and a pin 185 passes through the shaft to engage the sleeve in the slot. In this way, the pricing disc 184 can be moved axially of the shaft 85 somewhat, even though it is mounted for rotation with the shaft. The pricing wheel 86 is also provided with a sleeve mounting it on the shaft, but it is not keyed directly to the shaft for rotation. As can best be seen in FIGURE 12 pricing wheel 86 and pricing disc 184 which rests on the wheel may be variably angularly connected with each other since the disc and the wheel are provided with cooperating teeth. When it is desired to change the position of the price wheel 86 with respect to the disc 184, and hence also with respect to the shaft 85, and the coin mechanism output 84, the disc 184 is raised a short distance and the price wheel 86 is rotated to the newly selected angular position. The price disc is once again lowered into engaging contact with the price wheel 86 and the two will rotate with the shaft as a unit once again.

As can best be seen in FIGURES 13 and 15, the price wheel 86 is equipped with a cam 186. The cam is configured to engage pin 187 on the latch 178. When the cam of the price wheel pushes against pin 187, the latch rotates to pull the latch tongue 181 to a position behind locking lever 172. In FIGURES 13 and 15 the cam on the lower price wheel is shown engaged with its latch, while the cam on the upper price wheel is not operating the latch.

When a given amount of money is placed in the coin mechanism, the output of the coin mechanism rotates through a predetermined angle from its starting position. In doing so it drives control shaft 85 through a predetermined angle from its starting position. From the foregoing, it can be sen that each of the price wheels will rotate with the shaft through the same predetermined angle. In order to set the locking mechanism of a given access door so that the door will be unlocked for the amount of money which has been deposited, one need only set the relative position of the price wheel and pricing disc so that the cam 186 is operating the latch at that angular position of the control shaft. Of course, calibrating marks can easily be placed on the price wheel to assist in the accomplishment of this setting. Each of the several price wheels can be set with respect to the control shaft in a different position, in which case different amounts of money must be deposited in order to open the different doors. Alternately, two or more of the price wheels may be set at the same relative angular position, in which case the deposition of a given amount of money will cause two or more doors to be unlocked. If it is desired, the cam 186 can be configured so that access doors having articles of lower vending value than the amount of money deposited will be unlocked at the same time that an access door having articles of vending value exactly corresponding to the amount of money deposited is unlocked.

It should be noted in connection with FIGURE 11 that several pieces of control equipment are associated with the door locking mechanism. Switch SW-2 is mounted at the top of the tumbler column 87 in a position so that it will be actuated by the up and down movement of the top tumbler 176. From the foregoing it can be understood that switch SW-2 will be actuated in one direction by the opening of any access door and in the other direction by the closing thereof. At each tray level is a switch SW-1 positioned to be actuated by locking lever 172. In FIGURE 11 the switch SW-1 of the second door from the top is being operated by the locking lever 172 for that door inasmuch as the door is open.

*Commodity boxes*

In accordance with the invention an improved type of commodity box is provided for use in a shiftable box type vending machine. From FIGURES 4 and 5 it can be seen that the boxes define a generally rectangular prismatic volume, although they are rounded at the corners somewhat in order to provide for smooth passage of the boxes by one another. The commodity boxes may be constructed of any suitable material. Very satisfactory boxes have been constructed of plastics, which have the advantage of being smooth surfaced for easy sliding on the trays and past one another. When the boxes are used in a unit of the kind illustrated in the preferred embodiment herein having access doors in the side of the unit, one side of the box should have an opening therein for cooperation with the access door so the customer may see and reach the commodity carried in the box. In addition, for convenient loading, it is preferred that the commodity boxes are provided with top openings so that a tray may be slid out of the unit and loaded by dropping the commodities into the boxes from the top.

As was discussed hereinbefore in connection with the structure of the tray, the commodity box has a depending pusher block 59 which is preferably mounted on a post 60. Post 60 is proportioned as can be seen in FIGURE 6 to be of the same width as the guide slot 55 in the upper deck of the tray, while the pusher block 59 is somewhat larger in order to provide a locking action. As also appears in that figure, the block is cocked at an angle somewhat to provide an improved movement into and out of contact with the pusher studs 101 and 105 and the pusher blocks.

Considerable flexibility in dimensions of the boxes is available. However, it is preferred that the box be proportioned so that its width is substantially equal to half of the width of the tray with which it is to be used, so that two files will fit well on the tray. In addition, the box should be of a length or thickness somewhat less than one half the length of the tray, so that there will be room to transfer a box from one file to another across the ends of the files. In the embodiment shown herein, the boxes are considerably shorter than this maximum length so that each tray will accommodate a relatively large number of boxes.

A single compartment box may readily be converted to one having two compartments by mounting of the beforementioned partition 140 in a slot provided therefor on the back wall of the box.

*Cabinet enclosure*

The cabinet enclosure for the unit appears most clearly in FIGURES 1 and 2. From those figures it can be seen that the cabinet is generally a rectangular prism in shape and that, as mentioned above, it is provided with a large loading door 52 in the front of the unit. A rear door 188 is also provided. The trays 54 are mounted on rails 93 for sliding movement into and out of the cabinet enclosure. Depending on the type of location in which the machine is used, the trays may be adjusted to be slid out the front door of the unit or out through the back door.

If the unit is to be placed in a specially constructed building or room, it will be understood that the enclosure or cabinet may comprise no more than a wall structure where the machine is installed as a part of the building wall. In such an installation, the trays would most likely be serviced and loaded from the rear.

The cabinet enclosure may desirably be insulated so that the unit may be cooled or heated, and slabs of polyurethane foam serve this purpose well. Space is provided at the base of the machine for a refrigeration or heating unit. Various standard accessories such as lights, signs, and castors can be provided for the enclosure if desired.

Electrical control equipment

The manner in which the various parts of the vending machine are controlled may be best understood by a brief review of a typical operating cycle. A customer, when he decides to make a purchase, places money in the coin mechanism CM through coin slots 182. The coin mechanism causes control shaft 85 to rotate, and in doing so causes the unlocking of one or more doors. The customer then raises a door. This act causes switch SW–2 to be actuated in the upward direction, as seen on FIGURE 11, by top tumbler 176. This actuation of switch SW–2 causes the coin mechanism to reset itself at the starting position, and as a result the control shaft 85 is also returned to its starting position.

The opening of one of the doors also actuates one of the switches SW–1 by the unlocking lever 172, as can also be seen on FIGURE 11. Operation of switch SW–1 for a given tray actuates solenoid SOL–1 (see FIGURE 9) for that same tray, to drop the clutch sleeve for that tray into engagement with the gear 81.

The customer, after removing his commodity, either closes the access door or allows it to close by gravity. Closure of the door causes switch SW–2 to be actuated in the downward direction as top tumbler 176 drops away from it. This actuation of switch SW–2 starts motor M. Motor M turns shaft 80 and in the manner described hereinabove, the power so supplied to the tray whose clutch is engaged is utilized to shift the boxes about on the tray. As the shifting cycle comes to an end, actuating lever 108 operates switch SW–3. Operation of this switch energizes solenoid SOL–2 and the reset bar attached to this solenoid disengages and resets the clutch which had been operating. In this way the drive train between motor and the boxes is broken or interrupted at the clutch.

The lifting of reset bar 155 by SOL–2 brings pin 158 into contact with switch SW–4. Operation of this switch turns off motor M. Thus the equipment has gone through one complete cycle and has been restored to a condition where it is ready to make the next vending sale.

What is claimed is:

1. Apparatus for sequentially vending commodities comprising a generally rectangular commodity tray, an odd number of boxes positioned on said tray and slidably shiftable through a closed circuit having two files through and between the adjacent ends of which the boxes are shifted, driving means mounted on the tray engageable with said boxes on the tray for transferring boxes at the end of a file from one file to the other and for moving each of said files from one end of the tray to the other, means operated by said driving means operable to stop said power driving means when one of the boxes is at a point in said circuit partway between the two files, an enclosure surrounding said tray, and an access opening in said enclosure sized and positioned to provide access to only the box occupying a preselected position on the tray.

2. Apparatus for sequentially vending individual commodities comprising a commodity tray disposed horizontally, the tray being provided with a plurality of cam tracks forming closed loops thereon, a pair of cam wheels mounted for rotation on said tray, one of said cam wheels having an axis of rotation inside the loop of one cam track and the other cam wheel having an axis of rotation inside the loop of another cam track, each of said cam wheels having a follower lever pivotally mounted thereon, said lever carrying a depending cam follower engaged with a cam track, and further carrying an upstanding pusher element. an odd number of commodity boxes slidably mounted on said tray, each of said boxes being of a width substantially equal to one half that of the tray and of length less than one half that of the tray, each of said boxes being provided with a depending pusher block protruding into a portion of the path of movement of said pusher elements, and means for rotating said cam wheels.

3. Apparatus for sequentially vending individual commodities comprising a generally rectangular commodity tray disposed horizontally, said tray having a lower deck and an upper deck positioned a spaced distance above the lower deck, the lower deck being provided with a plurality of cam tracks forming closed loops thereon, a pair of cam wheels mounted for rotation on said lower deck, one of said cam wheels having an axis of rotation inside the loop of one cam track and the other cam wheel having an axis of rotation inside the loop of another cam track, each of said cam wheels having a follower lever pivotally mounted thereon, said lever carrying a depending cam follower engaged with a cam track, and further carrying an upstanding pusher element, said upper deck being provided with a generally rectangular slot therein, an odd number of generally rectangular commodity boxes slidably positioned on said upper deck, each of said boxes being of a width substantially equal to one half that of the tray and of length less than one half of the tray, each of said boxes being provided with a depending pusher block protruding through said slot and into a portion of the path of movement of said pusher elements, and means for rotating said cam wheels.

4. Apparatus for sequentially vending commodities comprising a generally rectangular commodity tray having a lower deck and an upper deck, an odd number of commodity boxes slidably positioned on said upper deck in two files, one file normally having a number of boxes equal to said odd number minus one divided by two, and the other file normally having the remainder of said boxes, power driven means mounted on said lower deck engageable with said boxes on the upper deck for transferring boxes at the end of a file from one file to the other and for moving each of said files from one end of the tray to the other, switch means operated by said power driven means, said switch means being operable to stop said power driven means, said power driven means including a switch actuator so positioned with respect to the remainder of said power driven means engageable with said boxes that it operates said switch means when a box is in transition from one file to the other, an enclosure surrounding said tray, and an access opening in said enclosure sized and positioned to provide access to only the box occupying a preselected position on the tray.

5. Apparatus for sequentially vending commodities comprising a generally rectangular commodity tray, an enclosure surrounding said tray, an access door in said enclosure positioned adjacent one corner of said tray at the front thereof, an odd number of commodity boxes mounted on said tray for shifting movement thereabout, said commodity boxes being initially positioned with one half of a number one less than said odd number of boxes aligned in a first file extending from a position adjacent said access door toward the rear of said tray, with an equal number aligned in a second file beside the first file and extending from near the front of said tray toward the rear thereof, and the remaining box positioned astride said two files, box pushing means engageable with each of said boxes from the bottom, said pushing means comprising cam guided pushers engageable with said boxes for pushing the boxes to and through said position astride of said two files, and means providing against shifting of a box from said astride position when the access door is open.

6. Apparatus for sequentially vending commodities comprising a generally rectangular commodity tray, an enclosure surrounding said tray, an access door in said enclosure positioned adjacent one corner of said tray at the front thereof, an odd number of commodity boxes mounted on said tray for sliding movement thereabout, said commodity boxes being initially positioned with one half of a number one less than said odd number of boxes aligned in a first file extending from a position adjacent said access door toward the rear of said tray, with an equal number aligned in a second file beside the first file and extending from near the front of said tray toward the rear thereof, and the remaining box positioned astride said two files, box pushing means engageable with each of said boxes from the bottom, said pushing means comprising cam guided pushers engageable with said boxes, a pair of cam wheels mounted beneath the surface of said tray, one being mounted toward the front of the tray and one being mounted toward the back thereof, each of said cam wheels having mounted thereon two of said cam guided pushers, means connecting said cam wheels with each other and fixing the relative angular positions therebetween, and means for rotating said cam wheels.

7. Apparatus according to claim 6 in which the cam guided pushers are angularly positioned on said cam wheels with respect to said cam wheels and with respect to each other so that upon operation of the cam wheels, the first guided cam pusher on the back cam wheel pushes the box astride said files into the second file, after which the first cam guided pusher on the front wheel pushes the first file to the back of the tray, after which the second cam guided pusher on the front wheel pushes the front box of the second file into the first file, after which the second cam guided pusher pushes the second file to the front of the tray, after which the first cam guided pusher pushes the rearmost box of the first file to a position astride said files.

8. A machine for vending articles comprising a cabinet enclosure, a plurality of superimposed sets of storage and vending boxes in the enclosure, each set comprising a plurality of boxes moveable in a horizontal rectangular circuit, for each set of boxes an access door in the enclosure located at a station at one side of the rectangular circuit of that set, the boxes each having a side wall opening providing for withdrawal of an article being vended through the associated access door, mechanism for shifting the boxes of each set stepwise through said circuit and thus sequentially to and past the access door for that set, and mechanism interlocking the operation of the several access doors with the operation of the box shifting mechanism, the interlocking mechanism including means providing against opening of more than one door between each stepwise shifting movement of a box in any of said sets.

9. A machine for vending articles comprising a cabinet enclosure, a plurality of superimposed sets of storage and vending boxes in the enclosure, each set comprising a plurality of boxes moveable in a horizontal rectangular circuit, for each set of boxes an access door in the enclosure located at a station at one side of the rectangular circuit of that set, the boxes each having a side wall opening providing for withdrawal of an article being vended through the associated access door, and a mounting tray for each set of boxes arranged for separate withdrawal from the cabinet enclosure to expose the top of the boxes, the boxes having top openings for loading purposes.

10. A machine for vending articles comprising a cabinet enclosure, a plurality of superimposed sets of storage and vending boxes in the enclosure, each set comprising a plurality of boxes moveable in a horizontal rectangular circuit, for each set of boxes an access door in the enclosure located at a station at one side of the rectangular circuit of that set, the boxes each having a side wall opening providing for withdrawal of an article being vended through the associated access door and mechanism for shifting the boxes of each set stepwise through said circuit and thus sequentially to and past the access door for that set comprising horizontal cam tracks lying between adjacent sets of boxes, and cam follower levers engageable with the boxes for effecting the shifting motion thereof.

11. In a vending machine, an enclosure, a plurality of boxes in the enclosure for storing and vending articles to be vended, the boxes being mounted for movement in a closed horizontal rectangular circuit, an access door in the enclosure located at a station at one side of the rectangular circuit, the boxes each having a side wall opening providing for withdrawal of an article being vended through the access door, and mechanism for shifting the boxes of each set stepwise through said circuit and thus sequentially to and past the access door comprising a pair of horizontal cam tracks located toward opposite ends of the rectangular circuit and follower levers associated with the cam tracks and engageable with the boxes to effect the shifting movement thereof.

12. A vending machine according to claim 11 and further including cam wheels on which said follower levers are mounted, the cam wheels being positioned between the cam tracks and the boxes.

13. For use in a vending machine of the shiftable box type, a commodity box having an opening in a side wall thereof to provide access to an article therein, the box further having a pusher block depending from the bottom for cooperation with pusher means.

14. A commodity box according to claim 13 further characterized by an opening in the top of the box for loading purposes.

15. A machine for vending articles comprising a cabinet enclosure, a plurality of superimposed sets of storage and vending boxes in the enclosure, each set comprising a plurality of boxes moveable in a horizontal rectangular circuit, for each set of boxes an access door in the enclosure located at a station at one side of the rectangular circuit of that set, the boxes each having a side wall opening providing for withdrawal of an article being vended through the associated access door, mechanism for shifting the boxes of each set stepwise through said circuit and thus sequentially to and past the access door for that set, the shifting mechanism including rotative drive parts for each set of boxes, and drive means for said drive parts comprising an upright shaft, a plurality of drive elements rotatively mounted on said shaft and respectively connected with said drive parts for each box set, and selectively operative clutches for connecting said elements to the upright drive shaft.

16. A vending machine according to claim 15 in which the clutches are actuated by gravity to engage the drive, and for each clutch releasable means for retaining the clutch disengaged.

17. A vending machine according to claim 16 and further including common resetting means for said clutches operative to disengage any clutch.

18. A vending machine according to claim 15 and further including common resetting means for said clutches operative to disengage any clutch.

19. A vending machine according to claim 18 and further including means operated by said shifting mechanism for actuating said resetting means.

20. A machine for vending articles comprising a cabinet enclosure, a plurality of superimposed sets of storage and vending boxes in the enclosure, different sets of boxes being adapted to be loaded with articles of different vending value, each set comprising a plurality of boxes moveable in a horizontal circuit, for each set of boxes an access door in the enclosure located at a station at one side of the circuit of that set, the boxes each having an opening providing for withdrawal of an article being vended through the associated access door, mechanism for shifting the boxes of each set stepwise through said circuit and thus sequentially to and past the access door for that set, and door control mechanism comprising a control shaft rotatable to different angular positions corresponding to the vending value of various articles, for each access door a releasable latching device providing against opening of that door, and for each latching device release means rotatable with the control shaft and angularly located in positions corresponding to the vending value of the various articles.

21. A machine according to claim 20 in which the release means for each of the latching devices comprises a release cam and a mounting wheel for the cam, and means providing for presetting of the wheel and cam in a plurality of different angular positions with respect to the control shaft corresponding to the vending values of different articles.

22. A vending machine according to claim 20 and further including means operated by closure of an access door for one set of boxes to activate the box shifting mechanism for that set to shift the boxes one step in the circuit of movement thereof.

23. A machine for vending articles comprising a cabinet enclosure, a plurality of superimposed sets of storage and vending boxes in the enclosure, different sets of boxes being adapted to be loaded with articles of different vending value, each set comprising a plurality of boxes moveable in a horizontal circuit, for each set of boxes an access door in the enclosure located at a station at one side of the circuit of that set, the boxes each having an opening providing for withdrawal of an article being vended through the associated access door, mechanism for shifting the boxes of each set stepwise through said circuit and thus sequentially to and past the access door for that set, and door control mechanism comprising a control shaft having a starting position and rotatable therefrom to different angular positions corresponding to the vending value of various articles, for each access door a releasable latching device providing against opening of that door, for each latching device release means rotatable with the control shaft and angularly located in positions corresponding to the vending value of the various articles, means actuated by opening of any access door to return the control shaft to starting position, and means operated by closure of an access door for one set of boxes to activate the box shifting mechanism for that set to shift the boxes one step in the circuit of movement thereof.

References Cited by the Examiner
UNITED STATES PATENTS

| | | | |
|---|---|---|---|
| 1,766,717 | 6/30 | Miller | 312—97 |
| 2,875,878 | 3/59 | Hoban | 312—97 |
| 2,912,097 | 11/59 | Vasalli | 198—158 |
| 3,102,762 | 9/63 | Johnson et al. | 312—197.1 |
| 3,122,401 | 2/64 | Johnson | 312—97.1 |

CLAUDE A. LE ROY, *Primary Examiner.*